(12) United States Patent
Eriksson et al.

(10) Patent No.: US 6,951,226 B2
(45) Date of Patent: Oct. 4, 2005

(54) SHEAR-RESISTANT MODULAR FLUIDIC BLOCKS

(75) Inventors: Mark L. Eriksson, St. Cloud, MN (US); Jeffry R. Markulec, St. Joseph, MN (US); Dennis G. Rex, Sunnyvale, CA (US)

(73) Assignee: Talon Innovations, Inc., Sauk Rapids, MN (US)

( * ) Notice: Subject to any disclaimer, the term of this patent is extended or adjusted under 35 U.S.C. 154(b) by 0 days.

(21) Appl. No.: 10/194,945

(22) Filed: Jul. 12, 2002

(65) Prior Publication Data

US 2003/0116208 A1 Jun. 26, 2003

Related U.S. Application Data

(60) Provisional application No. 60/305,235, filed on Jul. 13, 2001.

(51) Int. Cl.[7] .................................................. F16K 27/00
(52) U.S. Cl. ....................................... 137/884; 137/269
(58) Field of Search ................................. 137/269, 271, 137/884

(56) References Cited

U.S. PATENT DOCUMENTS

| | | | | | |
|---|---|---|---|---|---|
| 3,111,139 A | * | 11/1963 | Beckett et al. | .............. | 137/884 |
| 3,215,158 A | * | 11/1965 | Bass, Jr. et al. | ............ | 137/269 |
| 3,563,131 A | * | 2/1971 | Ridley | ......................... | 411/384 |
| 4,218,067 A | * | 8/1980 | Halling | ....................... | 277/205 |
| 4,334,785 A | * | 6/1982 | Blach | ........................... | 366/79 |
| 4,603,892 A | * | 8/1986 | Abbes et al. | ............... | 285/336 |
| 4,848,405 A | * | 7/1989 | Albrecht | ..................... | 137/884 |
| 4,934,411 A | * | 6/1990 | Albrecht | ..................... | 137/884 |
| 5,836,355 A | * | 11/1998 | Markulec et al. | ........... | 137/884 |
| 5,964,481 A | * | 10/1999 | Buch | ........................... | 285/18 |
| 6,085,783 A | * | 7/2000 | Hollingshead | .............. | 137/597 |

* cited by examiner

*Primary Examiner*—John Fox
(74) *Attorney, Agent, or Firm*—McDonnell Boehnen Hulbert & Berghoff LLP

(57) ABSTRACT

A block for a modular fluid block assembly is disclosed. The block includes first and second opposed faces and first and second apertures from the first face to the second face for receiving a fastener. Each aperture includes a first end and a second end and a head receiving cavity disposed adjacent the first end. The block further includes a fluidic passage passing from the first face to the second face and a pair of fastener receiver cavities in the first face. The block further includes a pair of head receiving cavities in the second face.

20 Claims, 4 Drawing Sheets

EXPLODED VIEW OF A TYPICAL 3-BLOCK SEAL TEST ASSEMBLY. NOTE THE C-SEALS USED TO HERMETICALLY SEAL THE FLUID PORTS THAT TERMINATE AT THE CENTER OF THE BLOCK INTERFACES.

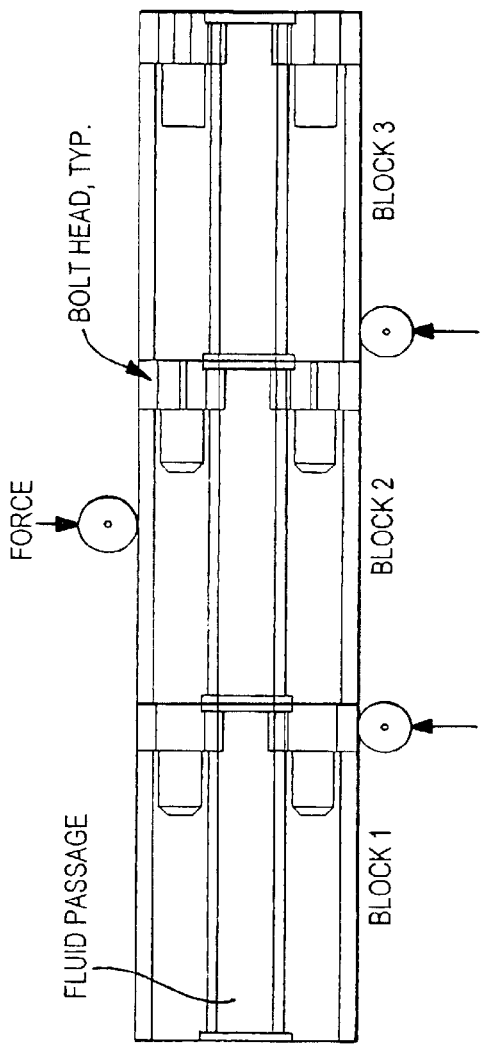

FIG. 2

3-POINT SHEAR TEST USED TO INDUCE MAXIMUM SHEAR STRESS AT BLOCK INTERFACES, WHILE INDUCING MINIMUM BEND STRESS. NOTE THAT THE HEADS OF THE BOLTS USED TO COMPRESS THE BLOCKS AND THE SEALS BETWEEN THEM ARE FLUSH WITH THE BLOCK INTERFACES. IN THIS CONVENTIONAL CONSTRUCTION, C-SEALS BEGIN TO LEAK WHEN SHEAR STRAIN BETWEEN BLOCKS IS .003" OR MORE.

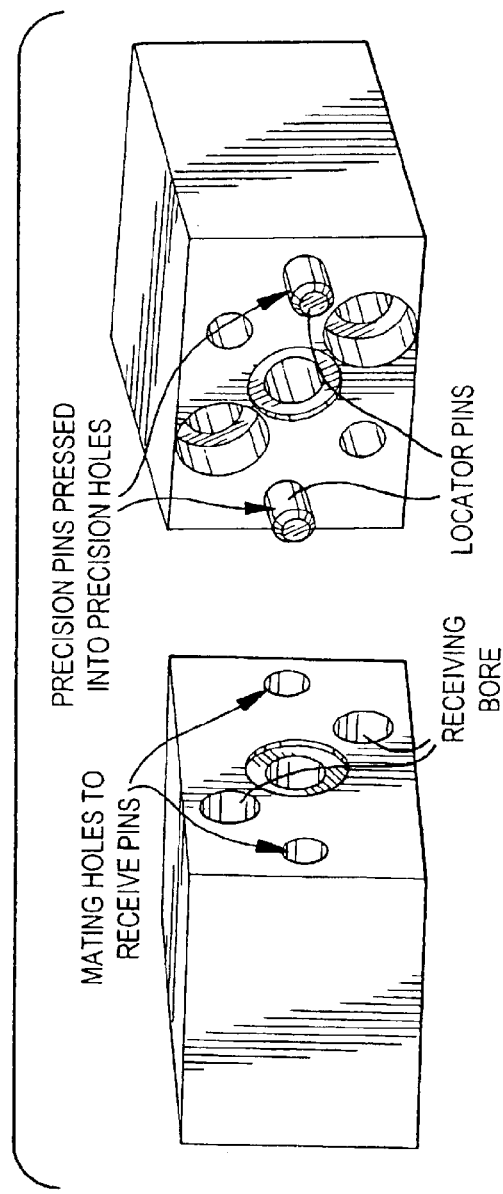

FIG. 3

MODULAR FLUIDIC BLOCKS INCORPORATING A METHOD OF PINS AND HOLES FOR SHEAR RESISTANCE.

FIG. 4

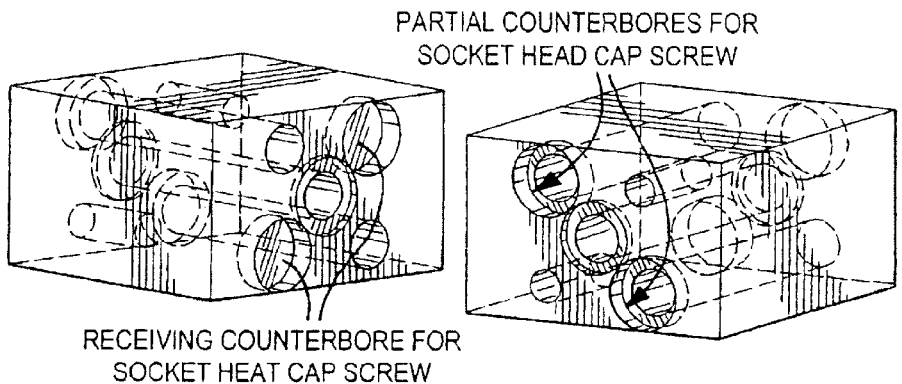

MODULAR FUIDIC BLOCKS INCORPORATING THE PRESENT INVENTION OF PARTIAL COUNTERBORES FOR SOCKET HEAD CAP SCREWS FOR PRACTICABLE AND COST-EFFECTIVE SHEAR RESISTANCE.

PARTIAL COUNTERBORES FOR SOCKET HEAD CAP SCREW

RECEIVING COUNTERBORE FOR SOCKET HEAT CAP SCREW

FIG. 5

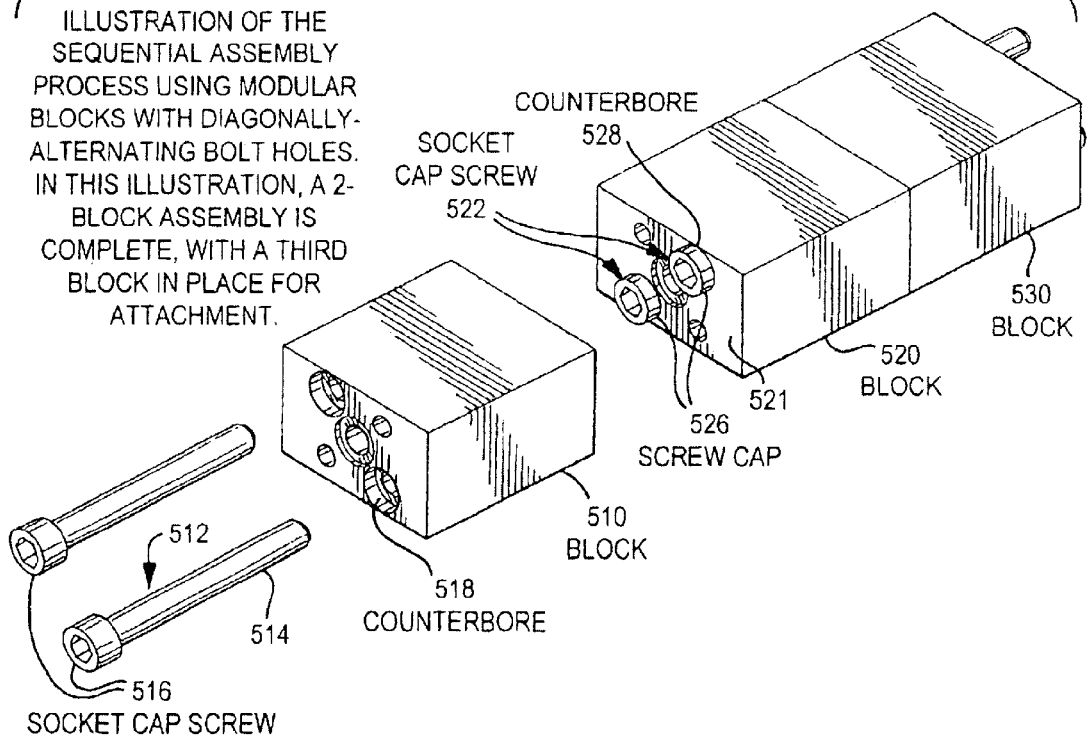

ILLUSTRATION OF THE SEQUENTIAL ASSEMBLY PROCESS USING MODULAR BLOCKS WITH DIAGONALLY-ALTERNATING BOLT HOLES. IN THIS ILLUSTRATION, A 2-BLOCK ASSEMBLY IS COMPLETE, WITH A THIRD BLOCK IN PLACE FOR ATTACHMENT.

FIG. 6

A 3-BLOCK ASSEMBLY ILLUSTRATING THE APPLICATION OF THE USE OF PRECISION SOCKET HEAD CAP SCREW HEADS TO PROVIDE BOTH BLOCK AND SEAL COMPRESSION AS WELL AS PROVIDE RESISTANCE TO SHEAR STRESS OF THE BLOCK INTERFACES.

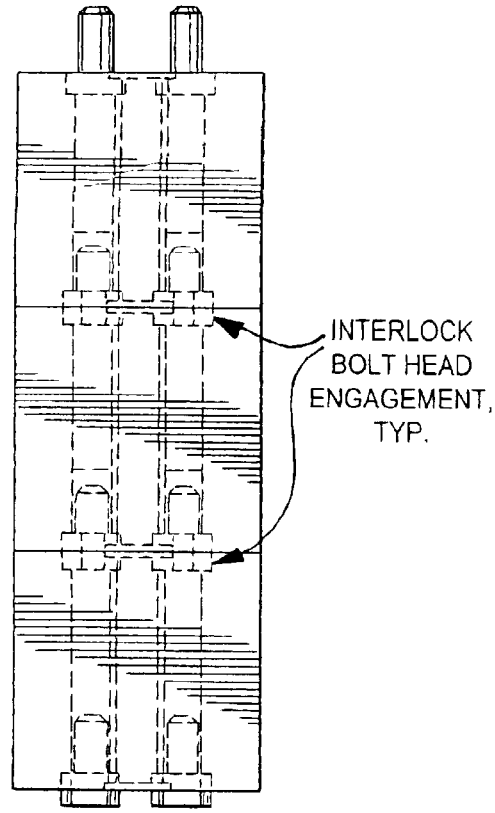

INTERLOCK BOLT HEAD ENGAGEMENT, TYP.

FIG. 7

EXAMPLE OF A TOXIC/CORROSIVE GAS APPLICATION

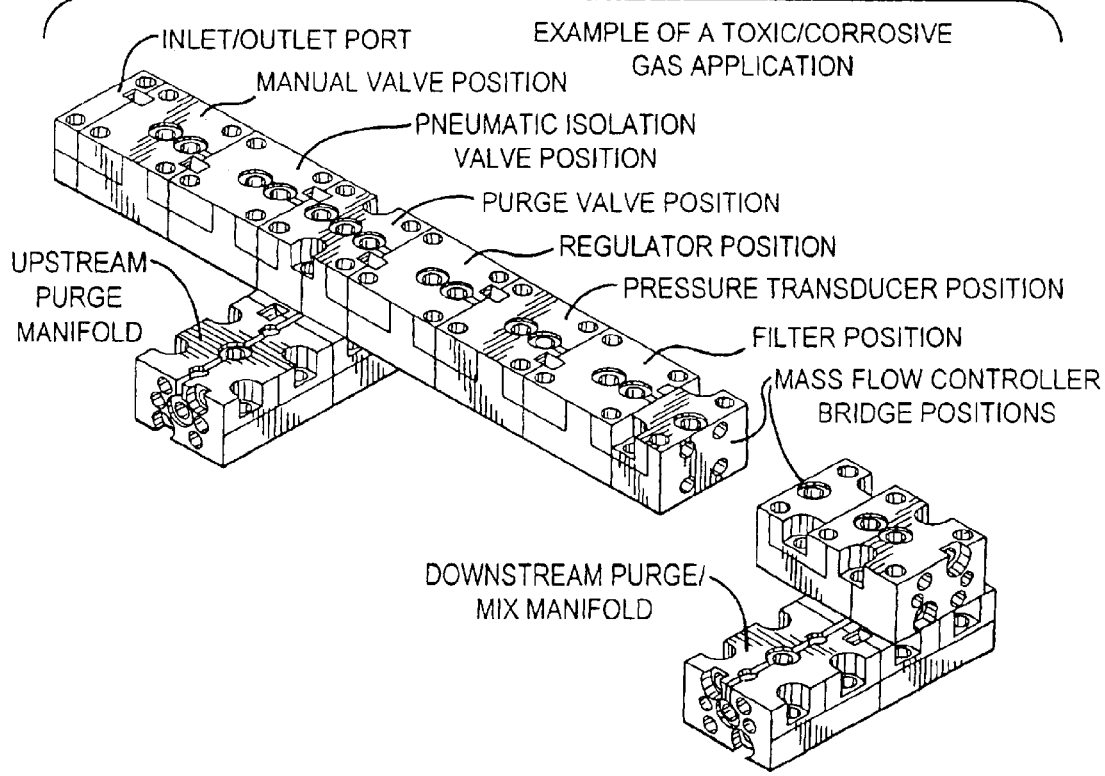

- INLET/OUTLET PORT
- MANUAL VALVE POSITION
- PNEUMATIC ISOLATION VALVE POSITION
- PURGE VALVE POSITION
- REGULATOR POSITION
- PRESSURE TRANSDUCER POSITION
- FILTER POSITION
- MASS FLOW CONTROLLER BRIDGE POSITIONS
- UPSTREAM PURGE MANIFOLD
- DOWNSTREAM PURGE/MIX MANIFOLD

SHEAR-RESISTANT MODULAR FLUIDIC BLOCKS

PRIORITY

This application claims priority to provisional patent application 60/305,235, filed Jul. 13, 2001, entitled SHEAR RESISTANT MODULAR FLUIDIC BLOCKS.

FIELD OF THE INVENTION

The present invention relates to the field of fluid handling devices generally, and particularly to an apparatus and method for joining modular fluid handling blocks used in the semiconductor industry.

BACKGROUND OF THE INVENTION

The advent and usefulness of modular architectures for semiconductor fabrication fluids are disclosed in U.S. Pat. No. 5,836,355 issued to Markulec et. al. on Nov. 17, 1998, in U.S. Pat. No. 5,964,481 issued to Buch on Oct. 12, 1999, and in U.S. Pat. No. 6,085,783 issued to Hollingshead on Jul. 11, 2000. These various architectures, or modular building blocks, for fluid delivery afford ease of fluid system design, ease of assembly, reduced size, improved serviceability, and reduced wetted surface area when compared to conventional tubulated-and-welded fluid delivery systems.

The modular blocks, sometimes referred to as substrates, disclosed in the patents cited above, share some common features, among which are the planar block interfaces which, when compressed one against another with an interdisposed seal, form a contiguous and hermetic path for fluid delivery. Compression of multiple blocks may be effected several ways. One way is to use "long" bolts cut to the length specific to a particular multi-block assembly and which, when inserted through accommodating holes in the plurality of blocks and fasteners thereon tightened, compress all the blocks, block interfaces, and inter-block seals simultaneously. Another way is to bolt, in turn, one block or substrate to another in a sequential and iterative fashion with "short" bolts to accomplish the desired multi-block assembly.

When assembled into fluid delivery panels and completed by the attachment of functional control elements such as valves, regulators, pressure transducers and the like, these modular fluid delivery systems are currently used in virtually all types of semiconductor fabrication processes. By their very nature, these processes often employ fluids that are extremely toxic and/or volatile. Further, introduction of contamination, such as air, to various of these fluids, or escape of these fluids to air, may result in failure of the process and loss of product, downtime of the process, or worse, severe injury or fatality to operating personnel. Specifically, it is imperative that the hermeticity, or seal integrity, of the compressed-and-sealed interfaces of all the blocks comprising the fluidic delivery system remain uncompromised throughout delivery, installation, and operational lifetime of the system, making the mechanical and leak integrity of bolted-together modular fluid-delivery systems is of the highest priority.

Current practice for sealing modular fluid-delivery blocks one to another, wherein seals are required, calls for the use of compressible toroidal metal gaskets often referred to as C-seals. This type of seal has been specified by SEMI draft document 2787.1 as the standard seal for use in sealing components, such as valves, regulators, filters, etc. to modular fluid-delivery blocks in the semiconductor industry, and as such has become the de facto standard for inter-block seals as well. Examples of these seals may be seen in U.S. Pat. No. 4,603,892 issued to Abbes on Aug. 5, 1986 and U.S. Pat. No. 4,218,067 issued to Halling on Aug. 19, 1980. In general, these seals have been designed to be compressed between opposing metal surfaces to form a hermetic seal between them. The seals themselves are designed to have inherent elastic deformation sufficient to maintain conformation to said opposing metal surfaces, when compressed to prescribed limits between opposing and appropriately-finished metal surfaces, with sufficient resilient force to create a hermetic seal.

All fluid delivery systems, including modular block architectures, for semiconductor processing applications must pass rigorous shock and vibration qualification, as put forth in SEMI document #3091, as well as meet practical objectives for robustness as presented earlier. What is needed, then, is a practical, cost-effective method to provide mechanical robustness, particularly shear resistance, between modular blocks of increasingly small sizes compressed with increasingly smaller bolts.

SUMMARY OF THE INVENTION

One embodiment of the present invention is directed to a modular fluid-delivery block system is provided in which the modular blocks are bolted one to the next and in which partially-protruding bolt heads from one block engage recessed counterbores in the next block to provide shear resistance. The diameters of the counterbores are sufficiently small such that the bolt heads cannot shift laterally by more than a predetermined amount; the predetermined amount is less than the amount of shift that is likely to result in a leakage in the system.

Another embodiment of the present invention is directed to a block for a modular fluid block assembly is disclosed. The block includes first and second opposed faces and first and second apertures from the first face to the second face for receiving a fastener. Each aperture includes a first end and a second end and a head receiving cavity disposed adjacent the first end. The block further includes a fluidic passage passing from the first face to the second face and a pair of fastener receiver cavities in the first face. The block further includes a pair of head receiving cavities in the second face.

BRIEF DESCRIPTION OF THE DRAWINGS

FIG. 2 is a side view of a 3-block fluidic assembly and schematic representation of 3-point shear testing.

FIG. 3 is a perspective view of an example embodiment of a shear resistant modular fluidic block assembly of the present invention.

FIG. 4 is an perspective view of an example embodiment of fluidic block interfaces that of the present invention.

FIG. 5 is a perspective view an example embodiment of an assembly sequence of fluidic blocks of the present invention.

FIG. 6 is a plan view of an example embodiment of a 3-block assembly of fluidic blocks and the disposition of bolt heads of the present invention.

FIG. 7 is an isometric view of an example embodiment of a modular fluid-delivery assembly of the present invention.

DETAILED DESCRIPTION OF THE INVENTION

Figure 1:
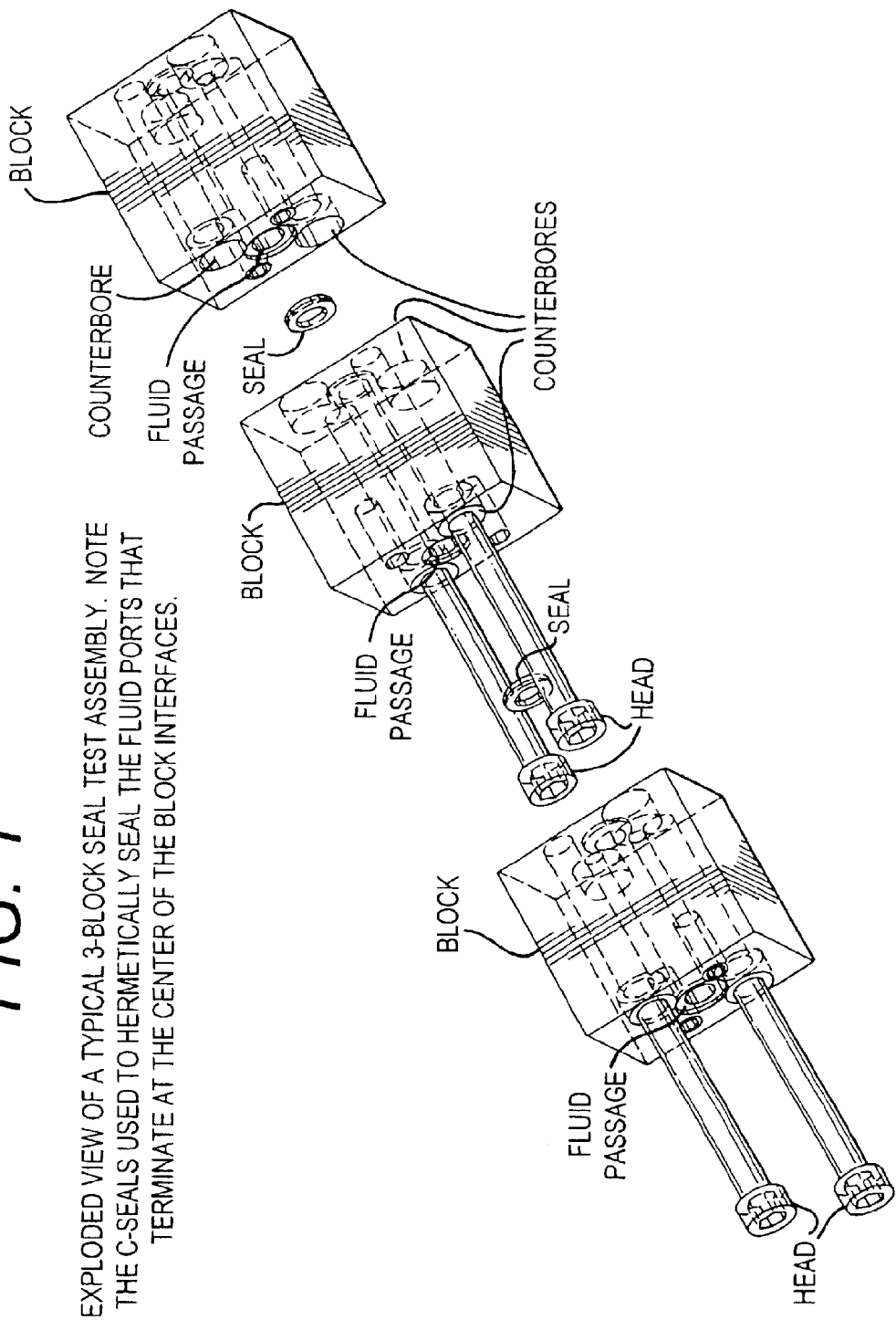
FIG. 1 is an exploded perspective view of an example embodiment of a modular fluidic block assembly of the present invention.

The invention described in this application is useful with all modular fluidic assemblies that incorporate metal seals compressed between planar modular block surfaces for the purpose of effecting hermetic fluid paths therebetween. FIG. 7 shows the general environment in which a plurality of modular blocks are attached to form separate linear assemblies and gas paths. Various fluid measuring or flow-control devices can be attached to the modular blocks to suit the system needs. For example, a pressure transducer can be attached to a block (marked "PRESSURE TRANSDUCER POSITION" in FIG. 7) to provide a signal indicative of the pressure of the fluid.

Semiconductor manufacturing industry convention has placed significant emphasis upon reduction in size and weight of modular fluid-delivery systems. The resulting size of the modular blocks now used for these systems requires proportionally-smaller fasteners for the attachment of one block to another, and compression of the metal gasket between them. In practice, these fasteners are currently limited by spacial constraints to two 4 mm, or M4, bolts for attachment of one modular block to another. Further, because of the potentially corrosive environments in which the fluid delivery assemblies must function, only stainless steel, or similarly corrosion-resistant alloys may be employed. Thus both the size and alloy selections for the fasteners place practical limits on the fastener torque, and therefore the compressive force available for the assembly of one modular block to the next. In practice, the torque limit on M4 and similarly-sized socket head cap screws is limited by convention and hex wrench strip-out to 40 inch-pounds. All testing and results subsequently described herein are based upon assemblies limited to this torque specification.

Referring to FIG. 1, we can see an exploded assembly of three fluidic blocks incorporating an example embodiment of the present invention. Each block in this assembly is counter-bored to completely accept the full length of the heads of the bolts inserted into it. In practice, the threaded portion of the bolts extend completely through and beyond the block in which they are inserted for the purpose of engaging similarly disposed threaded holes in the next block to be attached and sealed. Referring to FIG. 2, shown is an assembly of the three blocks, and a schematic representation of the 3-point shear test used to test the mechanical resistance of the assembly to shear stress. As may be seen, two stationary supports, or anvils, were located just outboard of the center block to outboard block interfaces and measured force was applied to the middle of the center block until failure of either of the inter-block seals occurred. To detect seal failure, a helium mass spectrometer, or leak detector, was connected to the block assembly, and the assembly sprayed with helium, while the force was applied. For all tests, a surface plate and height gauge were employed to measure the initial and final offset of the center block's bottom surface relative to both outboard block's bottom surfaces for the purpose of quantifying shear strain or dislocation resulting in seal failure. For the assembly depicted in FIG. 2, it was determined that the force required to produce failure of at least one seal, averaged over numerous tests, is approximately 1200 pounds. Determined also was that this force correlated with a shear strain, or interblock dislocation, of 0.003 inches, causing the metal C-seal to fail in shear dislocation.

Given the physical limitations of any face-to-face assembled modular fluidic blocks, namely available bolt size, bolt torque, and coefficient of friction of the block surfaces, what is needed is a practical and cost-effective method of increasing the shear resistance of block-to-block assemblies. One such modification is to add locator dowels or pins to the modular block, as shown in FIG. 3. Referring to FIG. 4, we can see an example of this arrangement, in which precision pins are pressed into one block face, and corresponding receptive holes are machined into the mating face of the adjacent block. Upon assembly, the pins of one block register precisely in the holes of the next, and so forth.

To reduce complexity and cost of manufacturing the modular block systems while retaining the advantages of using shear-resisting dowels, another arrangement can be used, as shown in FIG. 4. Specifically, the counter-bores normally machined to accept the entire length of the head of the socket head cap screw are, in this embodiment, machined only partially in depth. For example, the depth of the counter-bores can be machined to only about half of the length of the head of the screw cap. Thus, when the bolts are tightened through a first block against an adjacent second block for the compression of the two block interfaces, approximately one-half of the length of the bolt heads remains extended or protruding from the face of the first block. We can see such an assembly in FIG. 5. In this example, blocks 510, 520 and 530 are to be assembled together, with the assembling of blocks 520 and 530 already complete. Socket cap screws 522, which are identical to the socket cap screw 516 for block 510, are shown to have been tightened to the required torque. The screw caps 526, fit in their respective counter-bores 528 in close lateral tolerance, a portion of the screw caps 526 protrude above the planar face 521 of the block 520. Further, referring again to FIG. 4, the preferred embodiment includes the machining of receiving counterbores in the next block of the assembly. Thus it can be appreciated, as may be seen in FIG. 1 and in FIG. 5, that this embodiment employs a diagonally alternating pattern of bolts and receiving counterbores for each sequential modular block in an assembly.

The sizes and tolerances for the cap screws linking the modular blocks and the counter-bores for receiving the caps of such screws are chosen such that the maximum lateral shift of a screw cap in the counter-bore where the cap is located does not lead to a leakage in the seal between the blocks on either side of the seal. One of skill in the art will recognize that the diameter of the counter-bores can be specified to be larger than the screw caps by an amount equal to the tolerance of the screw caps, and the total tolerance of the screw caps and counter-bores can be chosen to be required to be smaller than the amount of inter-block shift that would cause leakage. Commercial socket cap screws from many sources have been found to have a cap diameter tolerance of about 0.001 inches or less. Based on the commercial tolerances, the counter-bores for the screws can designed to be 0.001 inches wider than the screw caps and can be specified to have a tolerance of 0.001 inches. The total amount of inter-block shift can then be limited to 0.002 inches or less under standard testing conditions.

The present invention thus provides for significantly improved shear resistance by employing the bolt heads themselves as precision locating pins. A 3-block assembly as shown in FIG. 6 was tested for shear resistance. When tested for shear resistance employing the test method described previously, significant improvement was realized. For multiple assemblies and tests using commercial socket cap screws, the average force required to cause shear dislocation and seal failure increased to 3200 pounds. Using custom-made screws and counter-bores both having a tolerance of 0.0005 inches, the average force required to cause seal failure increased to 4800 pounds.

Transverse fluid communication between multiple linear modular assembles (or "sticks"), is accomplished with transverse assemblies, or manifolds, as may be seen in FIG. 7. Consequently, there typically exist spans of assembled modular blocks that remain substantially unsupported from the mounting plate to which they are attached. Shock testing of these modular assemblies indicates that with 80 G's shock input, a de facto semiconductor industry figure of merit, to an assembled modular gas system of this configuration, resonant shock transmission to the center of unsupported linear assemblies may well exceed 300 G's. The weight, with components attached, of typical unsupported spans can be five pounds, or more. Thus the instantaneous force on select inter-block seals may exceed 1500 pounds. The present invention, by improving the shear resistance of block-to-block seals from an average of 1200 pounds to 3200 pounds, provides both practical and cost-effective solution as well as commercial viability.

Referring to FIGS. 1 and 2, a 3-block test assembly comprised of three modular blocks with C-sealed interfaces compressed to the manufacturer's specification, will repeatedly sustain a deformation in the center of the assembly of 0.015 inches without leaking, but will typically fail and leak with an inter-block shear dislocation on the order of 0.003 inches. In other words, a 0.003-inch slippage or dislocation of one modular block relative to an adjacently-sealed modular block will cause a leak failure when using C-seals. Because the C-seals themselves must be compressed to specific manufacturer's recommendations for maximum seal integrity, modular fluid-delivery blocks are machined with recesses, annularly-disposed to inter-connecting fluid ports, to accommodate the C-seals such that when the modular blocks are bolted or otherwise compressed face-to-face, the C-seals are optimally compressed and hermetic inter-block sealing is effected.

The primary force that resists shear between any two compressed and C-sealed modular fluid-delivery blocks is simply the arithmetic product of the compressive force and the coefficient of friction of the inter-block surfaces. Because the C-seal itself is designed to be a compliant and compressible sealing element between the blocks, its frictional coefficient-compression product provides negligible shear resistance to the overall assembly. Because of size and weight constraints in modem semiconductor fabrication equipment and facilities, the semiconductor industry has placed considerable emphasis upon size-reduction of modular fluid-delivery systems. An interesting and significant by-product of this size reduction is the attendant necessity to use smaller bolts for the assembly, and therefore the seal compression, of smaller modular blocks. As a consequence of smaller bolts, available compressive forces are reduced because of reduced bolt torque capability, with a corresponding reduction of force to resist block-to-block shear stress during shipment, installation, and operation of the modular fluid delivery systems.

One aspect of the present invention is directed to a modular fluid block system including a first block having a first face and a second face and a pair of opposed fastener passages. Each fastener passage has a first end opening to the first face and a second end opening to the second face. The first block further includes a pair of fastener receiving cavities in the first face and a fluid passage from the first face to the second face. Each fastener passage includes a head receiving portion at the first end opening. The modular fluid block system a second block having a third face and a fourth face and a pair of opposed fastener passages. Each fastener passage has a third end opening to the third face and a fourth end opening to the fourth face. The second block further includes a pair of fastener receiving cavities in the third face and a fluid passage from the third face to the fourth face and wherein each fastener passage includes a head receiving portion at the third end opening. The first and second blocks are joined between the second and third faces by a fastener passing through the each of the fastener passages in the first block, and each fastener is removably secured a corresponding fastener receiving cavity in the third face of the second block. Each fastener includes a head portion received into a corresponding head receiving portion when the fastener is secured into a corresponding fastener receiving cavity.

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. A modular fluid block system comprising:
   a first block having a first face, a second face and at least two opposed fastener passages, wherein each of the opposed-fastener passages has (i) a first end opening to the first face, (ii) a second end opening to the second face, and (iii) a head receiving portion at the first end opening, and wherein the first block further includes a fluid passage disposed between the first and second faces;
   a second block having a third face, a fourth face and at least two of opposed fastener passages, wherein each of the opposed fastener passages has (i) a third end opening to the third face, and (ii) a fourth end opening to the fourth face, and wherein the second block further includes (i) at least two fastener receiving cavities in the third face, and (ii) a fluid passage from the third and fourth faces,
   wherein the first and second blocks are joined between the second and third faces by no more than two fasteners passing through the at least two opposed fastener passages in the first block, wherein each of the at least two fasteners is removably secured into one of the at least two fastener receiving cavities,
   wherein each of the two fasteners includes a head portion, wherein when each of the two fasteners is secured into its corresponding fastener receiving cavity at least a portion of each of the head portions is received into a corresponding head receiving portion, wherein each of the head receiving portions is sufficiently small in diameter such that the head portion cannot shift laterally by more than a predetermined amount, and wherein the predetermined amount is less than the amount of shift that results in a leak in the interface between the first and second blocks.

2. The system of claim 1, wherein the head-receiving portions in the first face are oriented along a first diagonal axis, wherein the head-receiving portions in the second face are oriented along a second axis, and wherein the first and second axes intersect at a center of each of the first and second diagonal axes.

3. The system of claim 1, wherein each of the fluid passages includes two fluid-passage ends and a central portion connecting the two fluid-passage ends, and wherein each of the first and second blocks includes a seal-receiving portion that is disposed circumferentially about the fluid-passage ends in at least the second face and third faces, respectively, and wherein each of the seal-receiving portions has a diameter larger than the a central portion of each of the respective fluid-passages.

4. The system of claim 1, wherein each of the opposed fastener passages of the second block has a head receiving portion at the third end opening, and further including a third block, the third block having a fifth face, a sixth face and at least two opposed fastener passages, wherein each of the opposed fastener passages of the third block has (i) a fifth end opening to the fifth face, (ii) a sixth end opening to the sixth face, and (iii) a head receiving portion at the third end opening, wherein the third block further includes (i) at least two fastener-receiving cavities in the third face and (ii) a fluid passage from the fifth to the sixth faces, wherein the second and third blocks are joined between the second and third faces by at least two fasteners passing through the at least two of the opposed fastener passages in the second block, wherein each of the at least two fasteners is removably secured into one of the at least two fastener-receiving cavities in the fifth face of the third block, wherein each of the at least two fasteners includes a head portion, wherein when each of the at least two fasteners passing through the second block is secured into its corresponding fastener-receiving cavity, at least a portion of the head portion is received into a corresponding head-receiving portion, wherein each of the head-receiving portions is sufficiently small in diameter such that each of the head portions cannot shift laterally by more than a predetermined amount, and wherein the predetermined amount is less than the amount of shift that results in a leak in the interface between the second and third blocks.

5. The system of claim 4, wherein each of the fastener passages in the first block are collinear with each of the fastener passages in the third block.

6. The system of claim 1, wherein the head-receiving cavities in the first face are oriented along a first diagonal axis, wherein the head-receiving cavities in the second face are oriented along a second axis, and wherein the first and second axes intersect at a center of each of the first and second diagonal axes.

7. The system of claim 1, wherein disposed adjacent to the fluid passage in the third face of the second block is a seal cavity, and wherein the seal cavity is operable to house a seal for preventing a leak at the interface of the second and third faces.

8. The system of claim 7, wherein each of the head-receiving portions is sufficiently small in diameter such that the head portion cannot shift laterally by more than a predetermined amount, and wherein the predetermined amount is less than the amount of shift that results in a leak around the seal.

9. The system of claim 7, further comprising at least two head-receiving portions in the second face of the first block for receiving at least a portion of head portions of fasteners disposed in the fastener receiving cavities of the second block when the second block is coupled to a third block.

10. The system of claim 9, wherein when at least a portion of the head portion of each fastener that couples the second block to the third block is received into a head-receiving portions in the second face of the first block, wherein the at least a portion of the head portion received into the head-receiving cavity in the second face is operable to provide resistance to a from a shear force applied to the interface between the second and third faces so as to prevent a leakage at the seal.

11. The system of claim 10, wherein at least a half of each of the head portions is received into the head-receiving portions of the second face.

12. The system of claim 11, wherein each of the diameters of each of the head receiving portions is 0.0005 inches larger than the head portion.

13. The system of claim 9, further comprising pin receiving cavities in the second face of the first block for receiving at least a portion of a pin protruding from the second block when the first block is coupled to the second block.

14. The system of claim 1, wherein each of the diameters of the head receiving portions is 0.001 inches larger than the head portion.

15. A modular fluid block assembly comprising:
a first block comprising:
first and second opposed faces;
at least two fastener passages disposed between the first and second faces, wherein each of the at least two fastener passages is operable to receive a fastener; and wherein each of the at least two fastener passages includes (i) a first end, and (ii) a second end;
a fluidic passage disposed between the first face and second faces; and
at least two head-receiving cavities disposed in the second face separate from the at least two fastener passages; and
a second block comprising:
third and fourth opposed faces;
at least two fastener passages disposed between the third and fourth faces,
wherein each of the at least two fastener passages is operable to receive a fastener; and wherein each of the at least two fastener passages includes (i) a first end, (ii) a second end, and (iii) a head receiving cavity that is disposed adjacent to the first end;
a fluidic passage disposed between the third face and at least one other of its faces; and
at least two fastener-receiver cavities disposed in the third face
wherein the first block is operable to being joined to the second block at an interface between the second and third faces by at least two fasteners passing through the at least two fastener passages in the first block, wherein each of the at least two fasteners is operable to be removably secured into a corresponding fastener-receiving cavity in the third face of the second block,
wherein the second block is operable to being joined to the third block at an interface between the fourth face and a given face of the third block by at least two fasteners passing through the at least two fastener passages in the second block, wherein each of the at least two fasteners passing through the second block is operable to be removably secured into a corresponding fastener-receiving cavity in the given face of the third block,
wherein each of the at least two fasteners passing through the second block includes a head portion, wherein when (i) the first block is joined to the second block and (ii) the second block is joined to the third block, then (i) a first portion of each of the head portions is received into its corresponding head-receiving cavity in the second block and (ii) a second portion of each of the head portions is received into its corresponding head-receiving portion in the first block.

16. The block of claim 15, wherein each of the head-receiving cavities in the first face are oriented along a first diagonal axis, wherein the head-receiving cavities in the second face are oriented along a second axis, and wherein the first and second axes intersect at a center of each of the first and second diagonal axes.

17. The block of claim 15, wherein each of the head-receiving cavities include a circular perimeter.

18. The block of claim 15, wherein the each of the head-receiving cavities in the first face are oriented along a first diagonal axis, wherein the fastener-receiving cavities in the first face are oriented along a second axis, and wherein the first and second axes intersect at a center of each of the first and second diagonal axes.

19. The system of claim 15, wherein each of the head-receiving cavities in the second block is sufficiently small in diameter such that the head portion cannot shift laterally by more than a predetermined amount, wherein the predetermined amount is less than the amount of shift that results in a leak in the interface between the second and third blocks.

20. The system of claim 19, wherein disposed adjacent to a fluid passage in the given face of the third block includes a seal cavity, wherein the seal cavity is operable to house a seal for preventing a leak at the interface of the fourth and given faces, wherein when at least a portion of the head portion of each fastener is received in its corresponding head-receiving portion in the fourth face, the at least a portion of the head portion of each fastener is operable to provide resistance to a leakage at the seal that results from a shear force applied to an interface between the fourth and given faces.

* * * * *